United States Patent
Lam

(10) Patent No.: US 11,359,546 B2
(45) Date of Patent: Jun. 14, 2022

(54) SYSTEM AND METHOD FOR CONTROLLING ENGINE SPEED WITH BOWED ROTOR MITIGATION

(71) Applicant: HONEYWELL INTERNATIONAL INC., Morris Plains, NJ (US)

(72) Inventor: Cecilia Lam, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 45 days.

(21) Appl. No.: 16/852,856

(22) Filed: Apr. 20, 2020

(65) Prior Publication Data

US 2021/0324801 A1 Oct. 21, 2021

(51) Int. Cl.
*F02C 7/277* (2006.01)
*F01D 25/34* (2006.01)

(52) U.S. Cl.
CPC .............. *F02C 7/277* (2013.01); *F01D 25/34* (2013.01); *F05D 2220/323* (2013.01); *F05D 2220/50* (2013.01); *F05D 2260/85* (2013.01)

(58) Field of Classification Search
CPC .......... F01D 25/34; F01D 25/36; F01D 19/00; F01D 19/02; F02C 7/26; F02C 7/268; F02C 7/27; F02C 7/275; F02C 7/277; F05D 2260/85; B64D 2013/0696
See application file for complete search history.

(56) References Cited

U.S. PATENT DOCUMENTS

| | | | |
|---|---|---|---|
| 5,235,801 A | 8/1993 | Evenson et al. | |
| 6,305,156 B1 * | 10/2001 | Lui | B64D 13/06 |
| | | | 60/788 |
| 7,066,710 B2 | 6/2006 | Wiggins et al. | |
| 7,147,430 B2 | 12/2006 | Wiggins et al. | |
| 9,567,906 B2 * | 2/2017 | Nesdill | F02C 7/26 |
| 10,100,744 B2 | 10/2018 | Mackin et al. | |
| 10,125,690 B2 * | 11/2018 | Zaccaria | F02C 7/277 |
| 10,174,678 B2 | 1/2019 | Schwarz et al. | |
| 10,221,774 B2 * | 3/2019 | Gelwan | B64D 31/12 |
| 10,309,317 B2 * | 6/2019 | Pech | F02C 7/268 |
| 10,457,401 B2 * | 10/2019 | Feulner | B64F 1/34 |
| 10,502,139 B2 | 12/2019 | Ross et al. | |
| 10,539,079 B2 | 1/2020 | Schwarz et al. | |
| 10,787,968 B2 * | 9/2020 | Clauson | F01D 19/02 |

(Continued)

FOREIGN PATENT DOCUMENTS

EP 3358151 A1 8/2018
WO 2010092080 A1 8/2010

*Primary Examiner* — Stephanie Sebasco Cheng
(74) *Attorney, Agent, or Firm* — Lorenz & Kopf, LLP

(57) ABSTRACT

Systems and methods to operate an engine in a bowed rotor mitigation mode. An engine starting system includes a starter coupled to the engine and with a compressor. A conduit system communicates a portion of the compressed air from the compressor to the starter. A load control valve controls compressed air from the compressor to the starter and to other loads. A starter air valve controls compressed air through the conduit system to the starter. At least one controller: receives a start signal from the engine; determines whether to initiate a bowed rotor mitigation of the engine; operates either the load control valve or the starter air valve to move to a predetermined static position; and operates the other of the load control valve or the starter air valve to achieve a target speed of the engine.

20 Claims, 5 Drawing Sheets

(56) References Cited

U.S. PATENT DOCUMENTS

| | | |
|---|---|---|
| 10,954,865 B2 * | 3/2021 | Mackin ................ B64D 13/06 |
| 2017/0234236 A1 | 8/2017 | Feulner et al. |
| 2018/0112600 A1 | 4/2018 | Kelly et al. |
| 2018/0209295 A1 | 7/2018 | Kemp et al. |
| 2019/0040799 A1 | 2/2019 | Gelwan et al. |

* cited by examiner

SYSTEM AND METHOD FOR CONTROLLING ENGINE SPEED WITH BOWED ROTOR MITIGATION

TECHNICAL FIELD

The present invention generally relates to the controlling the speed of gas turbine engines, and more particularly relates to controlling engine speed during startup routines, including during startups involving cold motoring.

BACKGROUND

Turbine engines, including aircraft main engines, may use an air turbine starter to initiate turbine engine rotation for startup. The air turbine starter may be coupled to a pneumatic source, such as compressed air, which impinges upon a turbine in the air turbine starter causing it to rotate at a relatively high rate of speed. The air turbine starter includes an output shaft that is coupled to the main engine gearbox such that the main engine is rotated with the air turbine starter. When the main engine reaches a predetermined speed, the main engine is ignited in the combustor (a normal start) such that a self-sustaining speed is achieved and operation is enabled without further assistance.

When a gas turbine engine is shut down, the hot rotor and casing components may cool and contract non-uniformly and therefore, may reach states where the rotor is slightly bowed and/or potential contact between rotating and non-rotating parts may occur. With increasingly tight tolerances and lighter weight components being used, starting a gas turbine engine under bowed rotor conditions may result in undesirable outcomes.

Accordingly, it is desirable to provide improved systems and methods for controlling engines starting actions, including to accommodate bowed rotor conditions. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, systems and methods affect starting an engine in a bowed rotor mitigation start mode. An engine starting system includes a starter coupled to one engine and includes an air source from a compressor. A conduit system communicates a portion of the compressed air from the compressor to the starter. A load control valve controls compressed air flow from the compressor to the starter and to other loads. A starter air valve controls compressed air flow through the conduit system to the starter. At least one controller: receives a start signal; determines whether to initiate a bowed rotor mitigation start mode of the main engine; operates either the load control valve or the starter air valve to move to a predetermined static position; and operates the other of the load control valve or the starter air valve to achieve a target speed of the engine.

In a number of additional embodiments, a method for starting an engine includes coupling a starter to an engine so that the starter is configured to rotate the engine. A compressor of an air source delivers compressed air. A conduit system is coupled between the compressor and the starter, so that the conduit system communicates the compressed air from the compressor to the starter. A load control valve is positioned in the conduit system to control the communication of the compressed air from the compressor to the starter and to other loads. A starter air valve is positioned in the conduit system to control the communication of the compressed air through the conduit system to the starter. At least one controller is coupled with the engine system and with the air source and may receive a start signal from the engine system. The controller(s): determine whether to initiate a bowed rotor mitigation start mode of the engine; operate either the load control valve or the starter air valve to move to a predetermined static position; and operate the other of the load control valve or the starter air valve to achieve a target speed of the engine.

In other embodiments, an engine starting system includes a main engine system with a starter coupled to rotate the main engine. An auxiliary engine system includes a compressor. A conduit system is coupled between the compressor and the starter to communicate compressed air including from the compressor to the starter. A load control valve is disposed in the conduit system to control the communication of compressed air to a number of loads including the starter. A surge control valve is disposed in the conduit system to divert a portion of the compressed air out of the conduit system bypassing a part of the auxiliary engine. A starter air valve is disposed in the conduit system to control the communication of the compressed air to the starter. At least one controller is coupled with the main engine system and with the auxiliary engine system to: receive a start signal from the main engine system; operate the load control valve to move to a pre-determined position; operate the surge control valve to maintain consistent operation of the auxiliary engine; and operate the starter air valve to achieve a target speed of the first engine.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
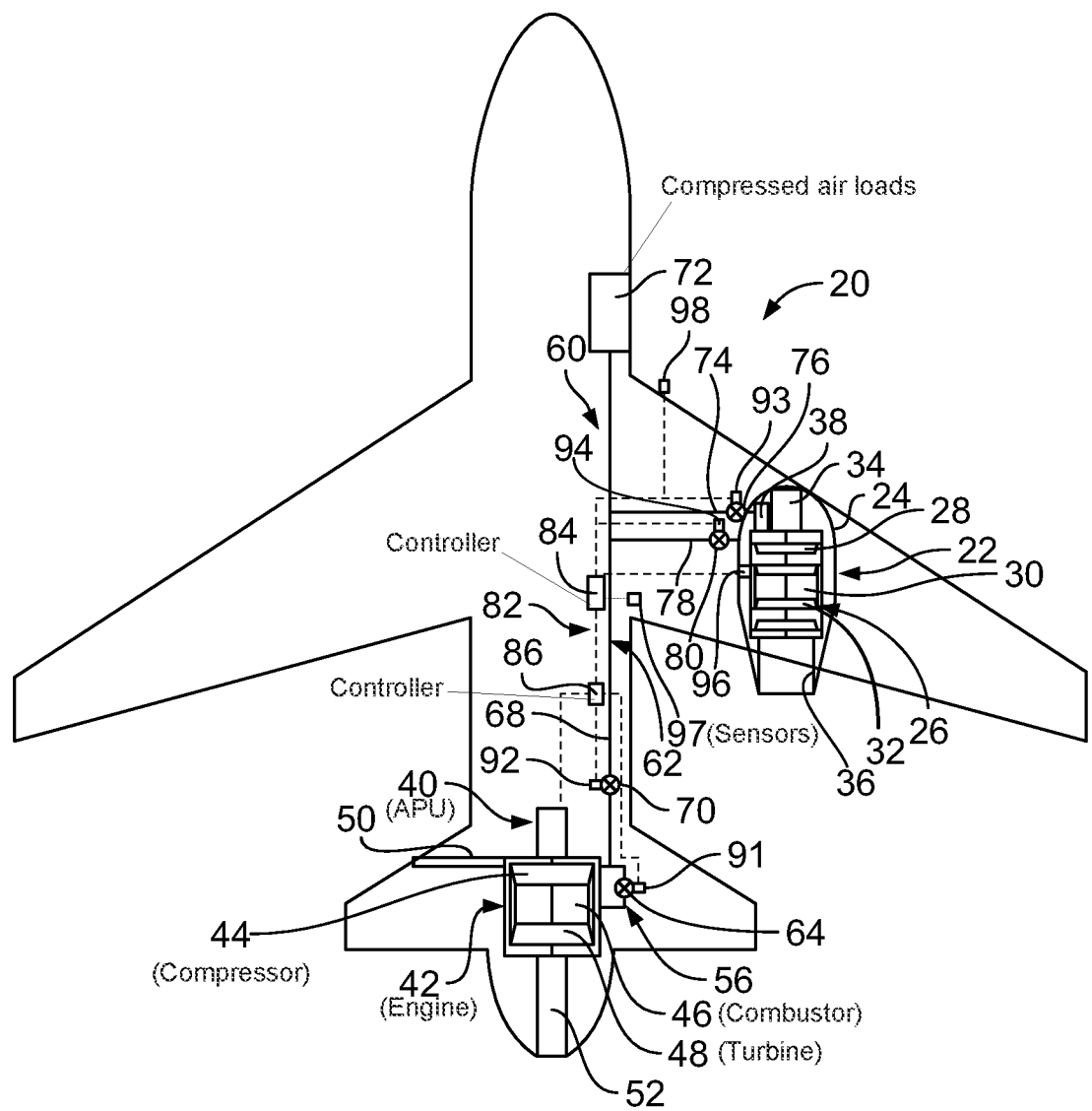
FIG. 1 is a schematic illustration of an aircraft with a starting system, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. Such block components (or modules) may be realized by any number of hardware, software, and/or firmware components configured to perform the specified functions.

The various illustrative logical blocks, modules, and circuits described in connection with the embodiments disclosed herein may be implemented or performed in a controller with any type of processor.

The steps of a method or algorithm described in connection with the embodiments disclosed herein may be embodied directly in hardware, in a software module executed by a processor, or in a combination of the two. A software module may reside in any form of storage medium known in the art. An exemplary storage medium is coupled to the processor such the processor can read information from, and write information to, the storage medium. In the alternative, the storage medium may be integral to the processor.

In a number of embodiments described herein, compressed air from a compressed air source may be used to start an engine. The engine being started by the compressed air may be a propulsion engine for powering the aircraft in flight. The system and methods used to start a propulsion engine may employ bowed rotor mitigation to accommodate any bowed rotor conditions that may arise. The source of the compressed air may be an APU, which feeds bleed air into a pneumatic system, or another compressed air source. In addition to use in engine starting, the pneumatic system may supply compressed air to other aircraft systems such as air conditioning. During various operating conditions of the aircraft, compressed air may be sourced not only from the APU, but also from an individual or a set of the aircraft's propulsion (main) engines. While the exemplary embodiments described herein may involve aircraft engines, the systems and methods of the current disclosure are not limited to aircraft and may be employed in any number of applications where speed control is desired.

In exemplary embodiments given herein, a conduit system is coupled between a compressor of an auxiliary engine and a starter of a main engine. A load control valve is disposed in the conduit system and controls communication of the compressed air through the conduit system from the compressor to a number of loads including to the starter. A surge control valve is also disposed in the conduit system and is selectively operable to selectively divert flow of the compressed air around the combustor of the auxiliary engine to maintain stable operating conditions and to prevent surge. A starter air valve is also disposed in the conduit system and controls communication of the compressed air to the starter to rotate the main engine at a select speed. When operating in a bowed rotor mitigation start mode, in response to an engine start request at least one controller operates the load control valve to move to a pre-determined open position selected for bowed rotor mitigation. A controller operates the surge control valve to move to a minimum open position, which may be closed. A controller operates the starter air valve in a modulating mode to achieve a target speed of the engine. Initially, the starter air valve may move to a predetermined open position. In a number of embodiments, bowed rotor mitigation is accomplished while only one valve, the starter air valve, needs modulation. In other embodiments, the modulation may be provided by the load control valve. The outcome is to rotate the engine in a type of cold motoring specifically tuned to bowed rotor mitigation. When the bowed rotor conditions are alleviated, the engine may proceed to light-off in a normal start.

In an exemplary embodiment of the present disclosure as illustrated in FIG. 1, an aircraft 20 may have any number of propulsion or main engine(s) 22. In the current embodiment, one engine 22 is illustrated for simplicity. It will be appreciated that other engines may be connected into the systems and operated in a manner similar to the methods described herein. The illustrated engine 22 has a nacelle 24 within which a rotor 26 is contained. The engine core includes one or more compressors 28, a combustor 30 and one or more turbines 32. The compressor(s) 28 and the turbine(s) 32 are part of the rotor 26. Air enters through an intake 34 for compression, combustion and expansion, and is exhausted through an exhaust section 36. A starter 38 is included for rotating the rotor 26 during a startup.

The aircraft 20 also includes an APU 40, which may supply generated electrical and bleed off pneumatic power for a variety of uses. The APU 40 includes a gas turbine engine 42 with a compressor 44, a combustor 46 and a turbine 48. Air enters through an intake 50 and is exhausted through a tailpipe 52. In general, the APU 40 supplies electrical power with a generator (not shown) and pneumatic power from the compressor 44 for use by various other systems. The APU 40 includes a bleed system 56 through which air, compressed by the compressor 44 and otherwise available to the combustor 46, is bled downstream around the combustor 46 and the turbine 48 and out through the tailpipe 52. In some embodiments, the bleed air is directed overboard instead of through the tailpipe 52. Bleeding compressed air may avoid surge conditions, providing stable operation of the APU 40. In a number of embodiments, the APU 40 operates stably over a broad range, especially at ground level, and surge control is only needed when the aircraft 20 is operating at elevation.

The bleed system 56 is part of a pneumatic system 60 that includes a conduit system 62 for distributing compressed air to various locations of the aircraft 20. A surge control valve 64 is disposed in the conduit system 62 and specifically in the bleed system 56 to control the amount of compressed air bled from the compressor 44 and discharged bypassing the combustor 46. Generally, when surge conditions are not incipient, the surge control valve 64 may remain at a controlled minimum state, which corresponds to closed.

Also in the conduit system 62, a conduit section 68 extends from the bleed system 56 toward the engine 22 and in this embodiment in a forward direction of the aircraft 20. A load control valve 70 is disposed in the conduit section 68 to control the communication of compressed air therethrough. The conduit section 68 leads to various compressed air loads 72 of the aircraft 20 and to the engine 22. It should be understood that the conduit section 68 will also lead to any other propulsion engines of the aircraft 20. The conduit system 62 includes a branch 74 that leads to the starter 38 and contains a starter air valve 76 to control the communication of compressed air therethrough. Another branch 78 connects the engine 22 with the conduit system 62 for the supply of compressed air from the engine 22, and specifically its compressor(s) 28, into the pneumatic system 60. An engine bleed valve 80 is included in the branch 78 to control the communication of compressed air therethrough and to control output of the compressor(s) 28 to the remainder of the pneumatic system 60. The engine bleed valve 80 may be a valve that is controlled or in other embodiments may be a type of pressure regulated shut-off valve.

A control system 82 of the aircraft 20 is associated with the engines 22, 42 and with the pneumatic system 60. The control system 82 includes a controller 84, which may be a full authority digital engine control (FADEC) unit. In the current embodiment, a second controller 86 is included, primarily for control of the APU 40 in coordination with the controller 84. In other embodiments, one or any number of controllers may be used in place of the controllers 84, 86. The controllers 84, 86 may comprise any number of electronic control modules and receive various input variables of current operating conditions and other parameters. The inputs are analyzed and operating parameters of the engine 22 are computed from the data and applied to actuators and other responsive devices as appropriate. The controller 84 controls engine starting routines and provide control for optimum engine operation under various conditions. For purposes of the current embodiment, the controllers 84 and 86 control operation of the engines 22 and 42 including speed, and operation of the various valves. Generally, the controller 84 controls speed of the engine 22. In regard to the valves, the surge control valve 64 includes an actuator 91, the load control valve 70 includes an actuator 92, the starter air valve 76 includes an actuator 93, and the engine bleed valve 80 includes an actuator 94 to effect valve operation in response to signals from the controllers 84 and 86. The controllers 84 and 86 may receive various signals, including from a speed sensor 96 a parameter sensor set 97 that may include sensors at the engine 22 or at other locations, and an ambient pressure sensor 98, conduct analyses, and send control signals to various destinations, including to the actuators 91-94.

Figure 2:
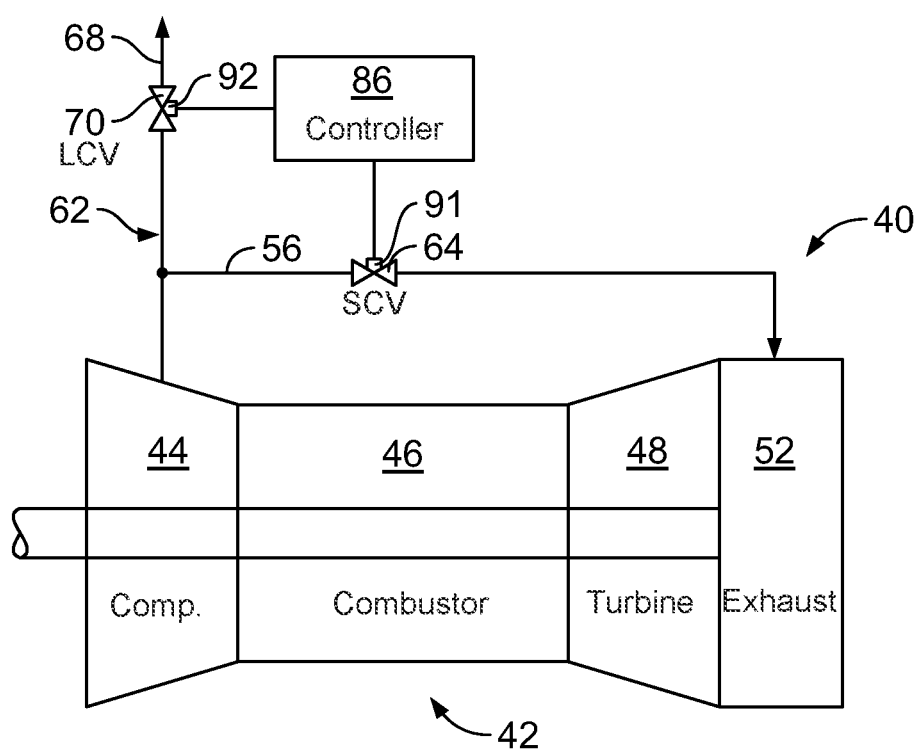
FIG. 2 is a schematic illustration of an auxiliary power unit (APU) system of the aircraft of FIG. 1, according to an exemplary embodiment.

Referring to FIG. 2, operation of the APU 40 includes compression of incoming air by the compressor 44 for delivery to the combustor 42. In this embodiment, the APU 40 includes the compressor 44 as the engine's power section compressor, and does not include a load compressor. A load compressor typically matches the demand for bleed air through operation of inlet guide vanes, which regulate the amount of air entering the load compressor. In the current embodiment, no such inlet guide vanes exist. Instead, when incipient surge conditions arise, the bleed system 56 diverts a portion of the compressed air through the surge control valve 64 when open, to the tailpipe 52 or directly overboard. This alleviates surge conditions.

The controller 86, which may be primarily an APU controller, controls operation of the engine 42 and the valves 64, 70, which may be done in coordination with the controller 84. For coordination, the controller 86 may be communicatively coupled with the controller 84.

The load control valve 70 is associated with controlling APU compressed air output to other parts of the aircraft 20 and is disposed in the conduit section 68. The load control valve 70 controls the communication of compressed air to the starter 38 and/or the loads 72. For purposes of bowed rotor mitigation operation of the engine 22, the load control valve 70 may be set to a predetermined bowed rotor mitigation position and the surge control valve may be set to a closed position during cold motoring. Movement of each of the valves 64 and 70 will change the pressure in various portions of the conduit system 62. Opening the surge control valve 64 will generally have an effect on the pressure available at the load control valve 70. Accordingly, the position of the surge control valve 64 is maintained during a cold motoring mode of operation for bowed rotor mitigation.

Figure 3:
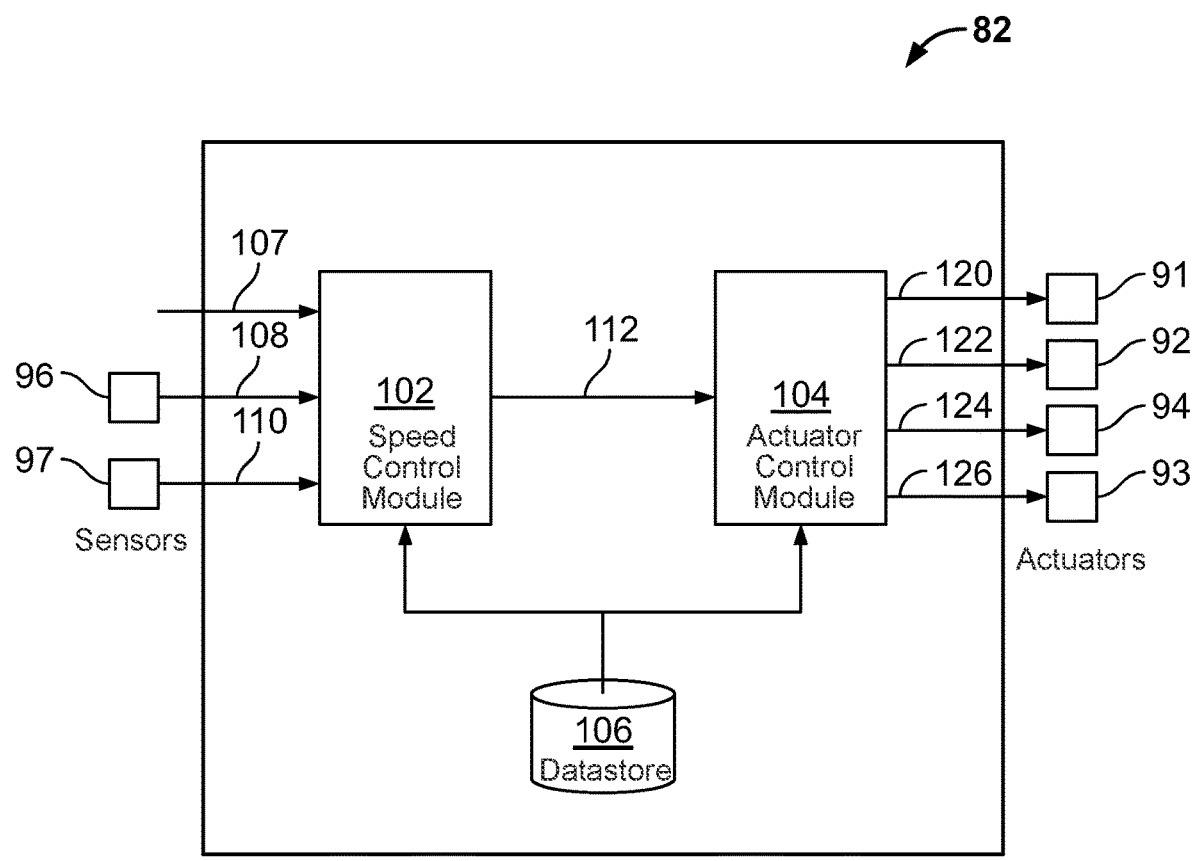
FIG. 3 is a diagram of a control system for controlling engine speed during a bowed rotor mitigation mode with starter air valve modulation, according to an exemplary embodiment.
Figure 4:
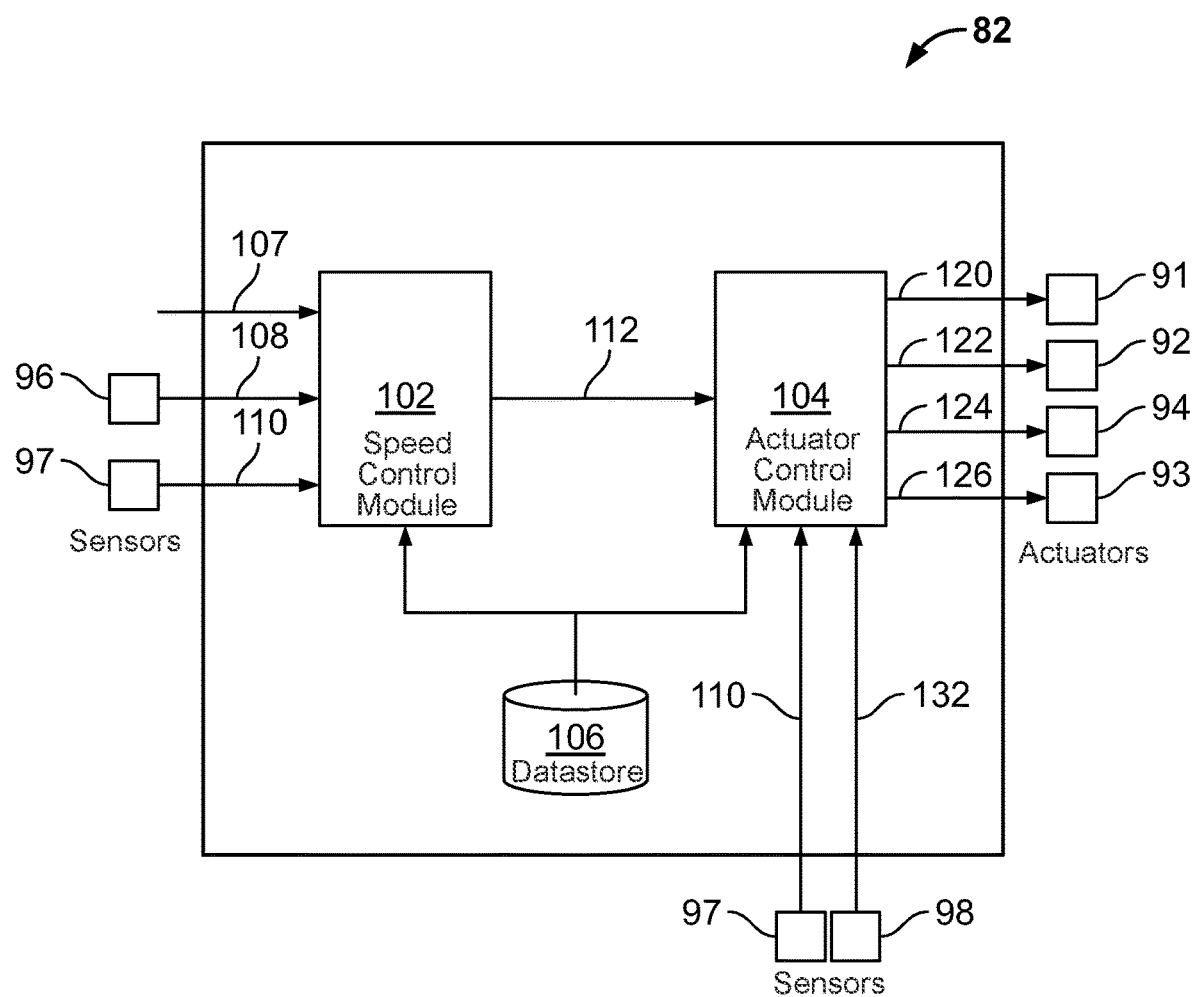
FIG. 4 is a diagram of a control system for controlling engine speed during a bowed rotor mitigation mode with load control valve modulation, according to an exemplary embodiment.

As illustrated in FIGS. 3 and 4, the control system 82 may include a number of modules for carrying out processes to provide the controllers 84, 86 with information about the aircraft 20, analyze that information, and to carry out control actions. In various embodiments, for engine speed control such as during startup, the control system 82 generally includes a speed control module 102, an actuator control module 104, and a datastore 106, which may correspond to the memory of the control system 82. The control system 82 may include any number of additional modules to control aspects of the engines 22, 42 and/or of the aircraft 20 independent of, or in coordination with the modules 102, 104. The speed control module 102 may receive inputs such as a start command signal 107, a speed signal 108 from the speed sensor 96, and a signal 110 providing information on parameters such as temperatures, time, or others relevant to motoring and/or starting of the engine 22 such as from the parameter sensor set 97. The speed control module 102 may, based on a main engine start command 107, generate a bowed rotor mitigation start mode command signal 112. For example, when information on the parameters received via signal 110 is within a predetermined range, the bowed rotor mitigation start mode command signal 112 may be issued to initiate cold motoring. In other conditions, such as when the aircraft 20 operates within an acceptable turn-around time, bowed rotor mitigation is not prescribed, and a normal start mode may be commanded (not shown). The speed control module 102 may access a speed schedule, such as from the datastore 106, that includes a main engine cold motoring schedule and/or a start schedule to determine the target engine speed. The control system 82 may monitor engine speed via a speed sensor 96, which delivers the speed signal 108, for closed loop control beyond initial startup. The functions of the speed control module 102 may be carried out by controller 84, while the functions of the actuator control module 104 along with the start mode command signal 112 may be carried out by the controller 84 or by the controller 86.

As shown in FIG. 3, the control system 82 further includes actuator control module 104 that, based on the bowed rotor mitigation start mode command signal 112, generates a signal 122 to command the load control valve 70 via its actuator 92. For a cold motoring start in bowed rotor mitigation mode, the load control valve 70 is commanded by the controller 86, and may receive signal 122 as a bowed rotor mitigation signal to move to a static predetermined bowed rotor mitigation position. In a number of embodiments, the load control valve has an operative position corresponding to maximum opening for supplying loads 72 and a normal start open position for starting the engine 22. Adding bowed rotor mitigation involves adding logic to the control system 82 for the single bowed rotor mitigation position, which is generally different than the normal start position to produce torque in the starter 38 for a bowed rotor mitigation speed in the engine 22. The optimal position of the load control valve 70 for bowed rotor mitigation in the engine 22 is determined, such as by analysis and testing, specifically for each application. The data for setting the load control valve 70 to the bowed rotor mitigation position is therefore, predetermined, and may be retrieved from the datastore 106.

For cold motoring in the bowed rotor mitigation mode, the signal 120 to set the position of the surge control valve 64 via its actuator 91, is based on data that may be retrieved from the datastore 106. In this embodiment, the position of the surge control valve is predetermined and corresponds to a minimum signal or closed position of the surge control valve 64. In the current embodiment, the control signal 124 delivered to the engine bleed valve 80 is also predetermined and is set to a minimum signal so that the engine bleed valve 80 is closed. In some embodiments, the engine bleed valve 80 may be automatically closed at this stage. When needed, data to support the determination to set the position of the engine bleed valve 80 may also be retrieved from the datastore 106. Accordingly, the surge control valve 64, the load control valve 70 and the engine bleed valve 80 are set to predetermined positions, readily retrieved from storage for the initiation of bowed rotor mitigation. Accordingly, controller programming changes are readily implemented and little computational capacity is consumed.

In the current embodiment, the starter air valve 76 is commanded by the signal 126 and is the only valve that is modulated in the current embodiment during bowed rotor mitigation, rather than being set to a predetermined position. In one exemplary embodiment, the signal 126 commands the actuator 93 via pulse-width-modulation closed-loop control using the speed signal 108 to achieve a target speed of the engine 22. In the current embodiment, the target speed is a cold motoring speed of the engine 22 predetermined to operate the engine 22 at a desired rate. The cold motoring speed for bowed rotor mitigation is specific to the application and is determined in advance such as by analysis and testing, and may be retrieved from the datastore 106. In a number of embodiments, such as may be used in applications with APUs that are not capable of operating without surge control over a sufficiently broad range to support the necessary cold motoring speed for bowed rotor mitigation under all conditions, the surge control valve 64 may be commanded to another position to protect against surge. In such applications, the actuator control module 104 initially sets the surge control valve 64 via the actuator 91 to the minimum position following which, the surge control valve 64 may be repositioned to avoid surge of the engine 42 if surge conditions are approached.

In a number of embodiments as illustrated in FIG. 4, the speed of the engine 22 may be controlled to provide bowed rotor mitigation by modulating the load control valve 70 and setting the starter air valve 76 to a predetermined position such as its normal start position, which may be a full-open position. This approach may be implemented by modifying the control logic of the load control valve 70, such as in the actuator control module 104. The surge control valve 64 is set, via the signal 120 to a predetermined minimum (closed) position. The engine bleed valve 80, via the signal 124, is set to a predetermined minimum (closed) position. In some embodiments, the engine bleed valve may be automatically closed at this stage and may remain in that state. The starter air valve 76 is set to its predetermined normal-start open position, which may be a full-open position and the load control valve 70 is modulated For example, the actuator control module 104 may retrieve data, such as from the datastore 106, to determine the signal 122 that corresponds to the setting for the current parameter and pressure conditions 97 and 98.

Figure 5:
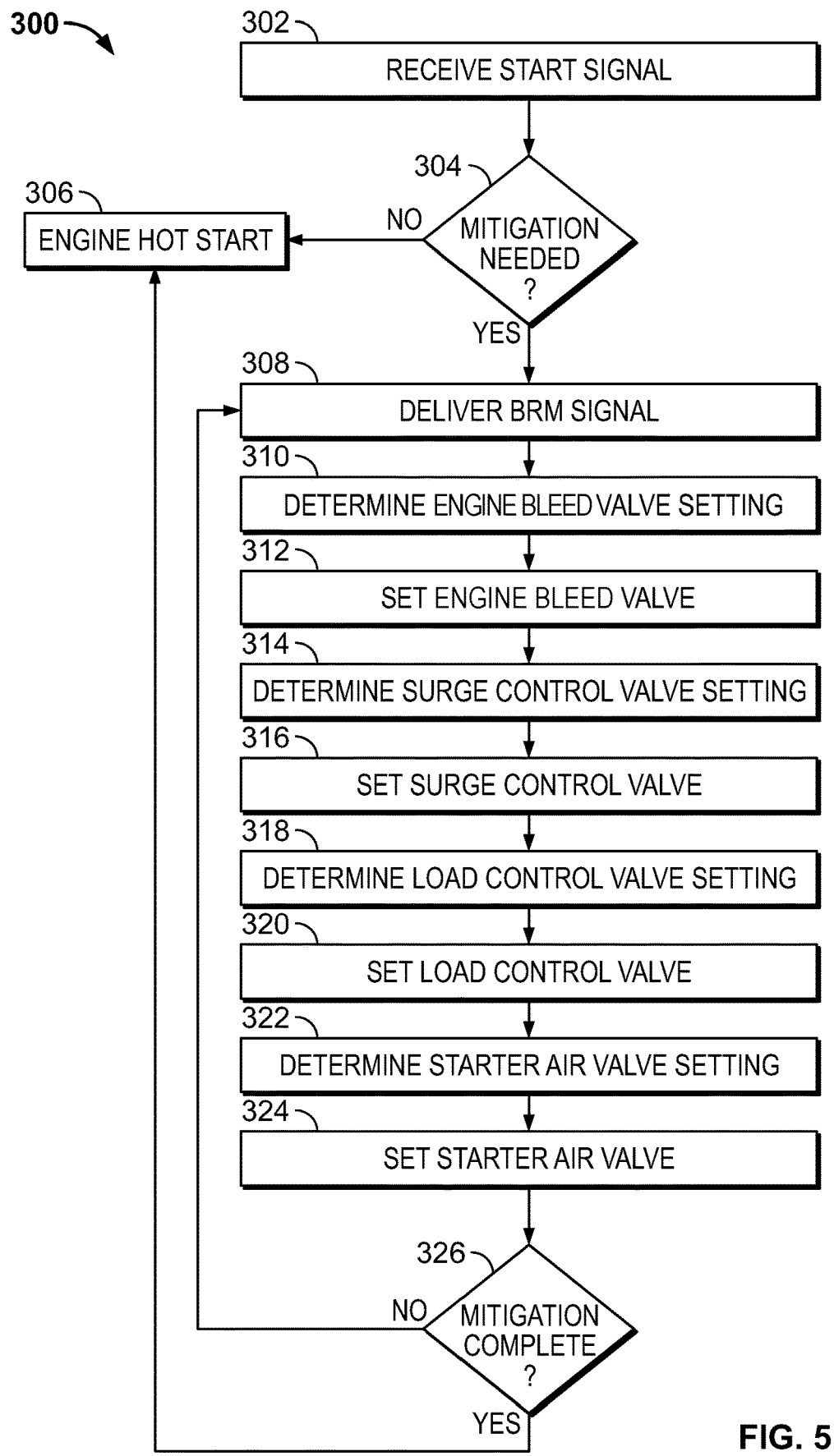
FIG. 5 is a flow chart of a method for starting an aircraft engine system, according to an exemplary embodiment.

A process 300 for starting the engine 22 with bowed rotor mitigation, which may be carried out by the control system 82, is illustrated in FIG. 5 in flowchart form. The process 300 begins 302 with receiving a main engine start command, such as the start command signal 107 of FIG. 3. A determination 304 is made, such as by the controller 84, whether to issue a bowed rotor mitigation start mode command signal 112. When the determination 304 is negative, and a normal start may be initiated, the process 300 proceeds to initiate 306 a normal start mode of the engine 22. When the determination 304 is positive and a bowed rotor mitigation start mode is prescribed, the speed control module 102 initiates 308 the bowed rotor mitigation start command signal 112. Based on the parameters delivered by the signal 110 from the sensor set 97, the control system 82 is configured to initiate 308 the bowed rotor mitigation start mode when prescribed and to initiate 306 a normal start of the engine 22 when the parameters are outside the range for which bowed rotor mitigation is prescribed. For example, when the engine 22 is operated on a short turn around time, conditions may not require bowed motor mitigation. The parameters used in the determination 304 may include an internal engine temperature, ambient temperature, time, or other parameters indicative of whether uneven cooling of the engine 22 has led to bowed rotor conditions.

Continuing with the process 300, the actuator control module 104 determines 310 the operation of the engine bleed valve 80 and sets 312 the position of the engine bleed valve to closed by the signal 124. This closed position/state may be a static position of the engine bleed valve for the duration of the bowed rotor mitigation mode. The actuator control module 104 also determines 314 the operation of the surge control valve 64, such as from a lookup table, and sets 316 the position to closed by the signal 120. The closed position/state of the surge control valve 64 may be static for the duration of the bowed rotor mitigation mode. The actuator control module 104 also determines 318 the operation of the load control valve 70, such as from a lookup table, and sets 320 the position to a predetermined bowed rotor mitigation position by the signal 122. The bowed rotor mitigation position may be a static position of the load control valve 70 for the duration of the bowed rotor mitigation mode. The actuator control module 104 also determines 322 the operation of the starter air valve 76, such as from data in the data store 106 and using the parameter signal 110 and ambient pressure signal 132, and sets 324 the operation of the starter air valve 76 by the signal 126. In another embodiment, the starter air valve 76 may be set to a predetermined fixed position for bowed rotor mitigation and the load control valve 70 may be modulated to set the speed of the engine 22. The control system 82 monitors the conditions of the engine 22 and, such as based on the parameter signal 110, determines 326 whether the bowed rotor mitigation conditions are alleviated. When the determination 326 is negative, and bowed rotor mitigation is not complete, the process 300 returns to step 308 and bowed rotor mitigation continues. When the determination 326 is positive and bowed rotor mitigation is complete, the process 300 proceeds to start 306 of the engine 22.

It should be appreciated that in a number of embodiments, the order of the steps in the process 300 may vary, other steps may be included, and some steps may be omitted. For example, in a number of embodiments, the load control valve 70 may be set 320 to a predetermined position and the starter air valve 76 is close loop controlled 324 to set engine speed. More specifically, the controller 84 may deliver a bowed rotor mitigation needed command when the determination 304 is positive, which is communicated with the control system 82 and the controller 86. Control system 82 determines 310 the position and moves 312 the engine bleed valve 80. Controller 86 determines 314 the position and moves 316 the surge control valve 64. Controller 86 determines 318 the position and moves 320 the load control valve 70. Then, controller 84 commands 322 starter air valve 76 via close loop to reach desired engine speed. Then controller 84 may determine 326 bowed rotor mitigation complete status. As another example, in other embodiments, the starter air valve 76 may be set 324 to a predetermined position and the load control valve 70 is controlled 320 to reach prescribed engine speed. More specifically, controller 84 may deliver a bowed rotor mitigation needed command when the determination 304 is positive, which is communicated with the control system 82 and the controller 86. Controller 82 determines 310 the position and moves 312 the engine bleed valve 80. Controller 84 commands 324 the starter air valve 76 to full open. Then, controller 86 moves 316 the surge control valve 64 and controller 86 moves 320 the load control valve 70. Then controller 84 determines 326 bowed rotor mitigation complete status. If bowed rotor mitigation engine speed is not satisfied, controller 84 will send a signal to controller 86 to increase or decrease speed. Based on this signal, controller 86 will initiate an adjustment to move 320 the load valve 70.

Through the examples described herein, bowed rotor mitigation may be implemented. For example, the approach may be implemented with programming changes in the controller(s) being limited to accomplishing one new position of the load control valve along with the control logic to implement the algorithms. In addition, bowed rotor mitigation is accomplished with an APU that provides bleed from its main compressor and may not include a load compressor. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. An engine starting system, comprising:
an engine system including an engine;
a starter coupled to the engine and configured to rotate the engine;
an air source including a compressor configured to deliver compressed air;
a conduit system coupled between the compressor and the starter, wherein the conduit system is configured to communicate compressed air from the compressor to the starter and to other compressed air loads;
a load control valve disposed in the conduit system between the compressor and the starter, and configured to control communication of compressed air from the compressor to the starter and to the other compressed air loads;
a starter air valve disposed in the conduit system between the load control valve and the starter, and configured to control communication of compressed air to the starter; and
at least one controller coupled with the engine and with the air source, the at least one controller configured to:
when a start signal is received from the engine system, determine whether to initiate a bowed rotor mitigation start mode of the engine;
if the bowed rotor mitigation start mode is initiated, operate one of the load control valve and the starter air valve to move to a predetermined static position that was previously stored for access by the at least one controller for bowed rotor mitigation, and operate, by modulating via an actuator during the bowed rotor mitigation, the other of the load control valve or the starter air valve to achieve a target speed of the engine,
wherein, the predetermined static position of the starter air valve for the bowed rotor mitigation corresponds to a start engine open position that is also used during normal start of the engine without bowed rotor mitigation, and the predetermined static position of the load control valve is a bowed rotor mitigation open position that differs from a normal start open position used during normal start of the engine without bowed rotor mitigation and a full open position used to supply compressed air to the compressed air loads.

2. The system of claim 1, wherein the load control valve is disposed in a section of the conduit system extending between the air source and the other compressed air loads, and comprising a surge control valve disposed in the conduit system and configured to divert compressed air out of the conduit system, bypassing a part of the air source, and effecting a flow reduction through the section, wherein the at least one controller is configured to set the surge control valve to be initially closed during the bowed rotor mitigation start mode to avoid the flow reduction.

3. The system of claim 2, wherein the conduit system includes a first branch extending between the section and the starter air valve, wherein the starter air valve is disposed in the first branch, and comprising an engine bleed valve disposed in a second branch of the conduit system, the second branch extending between the section and the engine, the engine bleed valve controlling communication through the second branch between the section and at least a portion of the engine other than the starter, wherein the at least one controller is configured to set the engine bleed valve to be closed during the bowed rotor mitigation start mode.

4. The system of claim 1, wherein the at least one controller is configured to operate the load control valve to the predetermined static position of the load control valve during the bowed rotor mitigation start mode and to modulate the starter air valve to achieve the target speed of the engine, wherein the predetermined static position of the load control valve is selected to produce a torque in the starter to produce a bowed rotor mitigation speed in the engine.

5. The system of claim 1, wherein the at least one controller is configured to operate the starter air valve to the predetermined static position during the bowed rotor mitigation start mode and to operate the load control valve to achieve a target speed of the engine.

6. The system of claim 1, comprising an engine bleed valve configured to control communication between the conduit system and at least a portion of the engine; and
a surge control valve configured to divert compressed air passing from the air source to the load control valve, wherein, upon initiation of the bowed rotor mitigation start mode, the controller is configured to set the load control valve to the predetermined static position of the load control valve, set the surge control valve to a second static position, set the engine bleed valve to a third static position, and modulate the starter air valve, wherein the controller is configured to maintain the load control valve, the engine bleed valve and the surge control valve in their respective static positions for the duration of the bowed rotor mitigation start mode.

7. The system of claim 1, comprising a surge control valve disposed in the conduit system and configured to divert compressed air out of the conduit system, bypassing a part of the air source, wherein the at least one controller is configured to:
operate the load control valve to the predetermined static position of the load control valve during the bowed rotor mitigation start mode;
operate the surge control valve to avoid surge conditions in the air source; and
modulate the starter air valve to achieve the target speed of the engine.

8. The system of claim 1, comprising:
a surge control valve disposed in the conduit system and configured to divert compressed air from reaching the load control valve and the starter, compressed air downstream of the surge control valve passing out of the conduit system; and
an engine bleed valve disposed in the conduit system to control communication between the conduit system and at least a portion of the engine,
wherein the at least one controller is configured to:
set the surge control valve to closed during the bowed rotor mitigation start mode;
set the engine bleed valve to closed during the bowed rotor mitigation start mode;
set the load control valve to the predetermined static position of the load control valve during the bowed rotor mitigation start mode; and
modulate the starter air valve during the bowed rotor start mitigation mode to achieve the target speed of the engine.

9. The system of claim 8, wherein the predetermined static position of the load control valve is configured to effect a rotation of the engine at a speed that is less than a normal start speed of the engine.

10. The system of claim 1, comprising a sensor set configured to determine parameters relevant to the bowed rotor mitigation of the engine, wherein the at least one controller is configured to initiate the bowed rotor mitigation start mode when the parameters are within a predetermined range and to initiate the normal start of the engine when the parameters are outside the predetermined range, wherein the parameters are indicative of bowed rotor conditions and comprise time form engine shutdown, ambient temperature and internal engine temperature.

11. The system of claim 1, wherein the air source comprises an auxiliary power unit of an aircraft and the system further comprises:
a compressor in the engine;
a section of the conduit system that extends from the auxiliary power unit to the other compressed air loads;
a first branch of the conduit system that extends from the section to the starter and includes the starter air valve; and a second branch of the conduit system that extends from the section to the compressor of the engine and includes an engine bleed valve,
wherein the starter air valve is configured to control flow through the first branch and wherein the engine bleed valve is configured to control flow through the second branch, including from the compressor to the conduit system, wherein the controller is configured to set the engine bleed valve to a predetermined position retrieved from a memory during the bowed rotor mitigation start mode.

12. A method for starting an engine in an engine system, the method comprising:
coupling a starter of the engine system to the engine so that the starter is configured to rotate the engine;
configuring a compressor of an air source to deliver compressed air;
coupling a conduit system between the compressor and the starter, so that the conduit system is configured to communicate compressed air from the compressor to the starter and to other compressed air loads;
positioning a load control valve in the conduit system between the compressor and the starter to control the communication of compressed air from the compressor to the starter and to the other compressed air loads;
positioning a starter air valve in the conduit system between the load control valve and the starter to control the communication of compressed air to the starter;
receiving, by at least one controller coupled with the engine system and with the air source, a start signal from the engine system;
in response to receiving the start signal, initiating, by the at least one controller, a bowed rotor mitigation start mode of the engine, which includes,
operating, by the at least one controller, one of the load control valve and the starter air valve to move to a predetermined static position that was previously stored for access by the at least one controller for bowed rotor mitigation, and operating, by modulating via an actuator during the bowed rotor mitigation, the other of the load control valve and the starter air valve, by the at least one controller, to achieve a target speed of the engine,
wherein the predetermined static position of the starter air valve for the bowed rotor mitigation corresponds to a start engine open position that is also used during a normal start of the engine, and the predetermined static position of the load control valve is a bowed rotor mitigation open position that differs from a normal start open position used during the normal start of the engine and a full open position used to supply compressed air to the other compressed air loads.

13. The method of claim 12, comprising:
positioning, a surge control valve in the conduit system to divert compressed air out of the conduit system, bypassing a part of the air source; and
setting, by the at least one controller, the surge valve to be closed during the bowed rotor mitigation start mode.

14. The method of claim 12, comprising:
positioning an engine bleed valve in the conduit system to control communication between the conduit system and at least a portion of the engine; and
setting, by the at least one controller, the engine bleed valve to be closed during the bowed rotor mitigation start mode.

15. The method of claim 12, comprising:
operating, by the at least one controller, the load control valve to the predetermined static position of the load control valve during the bowed rotor mitigation start mode; and
modulating, by the at least one controller, the starter air valve to achieve the target speed of the engine.

16. The method of claim 12, comprising:
operating, by the at least one controller, the starter air valve to the predetermined static position during the bowed rotor mitigation start mode; and
operating the load control valve to achieve a target speed of the engine.

17. The method of claim 12, comprising delivering, by the compressor, compressed air to a combustor of the air source, wherein the compressor comprises a power compressor.

18. The method of claim 12, comprising:
operating, by the at least one controller, the load control valve to the predetermined static position of the load control valve during the bowed rotor mitigation start mode;
positioning a surge control valve in the conduit system to selectively divert compressed air out of the conduit system, bypassing a part of the air source;
operating, by the at least one controller, the surge control valve to avoid surge conditions in the air source; and
modulating, by the at least one controller, the starter air valve to achieve the target speed of the engine.

19. The method of claim 12, comprising:
positioning a surge control valve in the conduit system to divert a portion of the compressed air out of the conduit system bypassing a part of the air source;
positioning an engine bleed valve in the conduit system to control communication between the conduit system and at least a portion of the engine;
setting, by the at least one controller, the surge control valve to be closed during the bowed rotor mitigation start mode;
setting, by the at least one controller, the engine bleed valve to be closed during the bowed rotor mitigation start mode;
setting, by the at least one controller, the load control valve to the predetermined static position of the load control valve during the bowed rotor mitigation start mode; and
modulating, by the at least one controller, the starter air valve during the bowed rotor start mitigation mode to achieve the target speed of the engine.

20. An engine starting system, comprising:
a main engine system having an engine;
a starter coupled to the engine and configured to rotate the engine;
an auxiliary power unit that includes a compressor;
a conduit system coupled between the compressor and the starter, the conduit system configured to communicate compressed air from the compressor to the starter and to other compressed air loads, the conduit system including a section coupling the compressor with the other compressed air loads, a first branch leading from the section to the starter, and a second branch leading from the section to the engine;
a load control valve disposed in the section of the conduit system and configured to control the communication of compressed air from the compressor to:
the other compressed air loads through the section,
to the engine through the second branch, and
to the starter through the first branch;
a surge control valve disposed in the conduit system and configured to divert compressed air out of the conduit system to bypass a part of the auxiliary power unit and flow away from the load control valve;
a starter air valve disposed in the first branch of the conduit system and configured to control the communication of compressed air to the starter; and
at least one controller coupled with the main engine system and with the auxiliary power unit, the at least one controller configured to:
receive a start signal from the main engine system;
determine, based on an internal engine temperature, ambient temperature, and a time since shutdown of the engine, whether to initiate a bowed rotor mitigation start mode of the engine where cold motoring of the engine precedes starting of the engine;
if the bowed rotor mitigation start mode of the engine is initiated,
operate the load control valve to move to a predetermined open position that was previously stored for access by the at least one controller, the predetermined open position comprising a static open position of the load control valve maintained for the duration of the bowed rotor mitigation start mode that is different from a normal start open position used during normal start of the engine and a full open position used to supply compressed air to the compressed air loads;
operate the surge control valve to maintain consistent operation of the auxiliary power unit during the bowed rotor mitigation start mode, including initially setting the surge control valve to a closed position and repositioning the surge control valve to avoid surge of the auxiliary power unit; and
modulate the starter air valve during the bowed rotor mitigation to achieve a target speed of the engine for cold motoring.

* * * * *